Aug. 12, 1969 R. KANE 3,461,248

VIDEO TAPE EDITING UTILIZING PHOTOELECTRIC MEANS

Filed June 20, 1963 3 Sheets-Sheet 1

Aug. 12, 1969 R. KANE 3,461,248

VIDEO TAPE EDITING UTILIZING PHOTOELECTRIC MEANS

Filed June 20, 1963 3 Sheets-Sheet 2

VIDEO TAPE EDITING UTILIZING PHOTOELECTRIC MEANS

Filed June 20, 1963

United States Patent Office 3,461,248
Patented Aug. 12, 1969

3,461,248

VIDEO TAPE EDITING UTILIZING PHOTOELECTRIC MEANS

Richard Kane, 410 Glenway Road, Philadelphia, Pa. 19118

Filed June 20, 1963, Ser. No. 289,334
Int. Cl. G11b *5/02*
U.S. Cl. 179—100.2 12 Claims

ABSTRACT OF THE DISCLOSURE

A method and apparatus for editing of video tape recordings. A physical, visible, effaceable mark is manually put on the tape at the position where editing is to be accomplished and a photoelectric sensing means is used to detect the interruption by the effaceable mark of a light beam reflected by the tape. The signal produced by the detection of the mark is used to initiate the recording of further information on the tape.

This invention relates to methods and equipment for the recording of video intelligence on magnetic tape.

In one aspect the invention contemplates improvements in methods and equipment for the editing of video tape which eliminates the cutting and splicing of tape segments.

In another aspect the invention contemplates improvements in methods and equipment for the editing of video tape which provides for automatic preview and/or rehearsal of the editing functions.

In another aspect the invention contemplates methods and equipment for assembling a master video tape which provide for automatically starting and stopping the recording of each of the segments making up the master tape, both the starting and the stopping of the recording being effected at precisely located positions on the tape.

In another aspect the invention contemplates methods and equipment for making an insert on video tape which provides for automatically starting and stopping the recording of the insert, both the stopping and the starting of the recording being effected at precisely located positions on the tape.

In another aspect the invention contemplates methods and equipment for automatically cuing the source of video intelligence; i.e., live performers, video tape recorder, movie projector, etc., so that the source is conditioned to be in action or operation at the precise time it is desired to preview, insert or assemble.

The methods and equipment for accomplishing the above will be described below in connection with the following drawings, wherein.

For accomplishing the automatic preview and the editing functions, the invention in one broad aspect contemplates the use of an effaceable mark on the video tape cooperating with a sensing device which is capable of sensing the presence of the effaceable mark as it passes through some predetermined point along the path of motion of the tape. The sensing device (in association with certain circuitry) develops electrical power which is used to initiate the preview or the edit functions. As understood in the art, the editing function comprises assembly, inserting and cuing.

The equipment of the invention is associated and coordinated with certain conventional video tape recording equipment in a way such that the composite structure can be used or manipulated to automatically obtain the preview and editing functions. Such conventional recording equipment includes, for example, a video tape recorder of the kind manufactured by the Ampex Corporation or the Radio Corporation of America. The video tape is conventional magnetic recording tape for use in recording television or video intelligence, for example, video tape of the kind manufactured by the 3M Company. Another piece of conventional equipment is the Electronic Editor manufactured by the Ampex Corporation which is a unit used for editing by controlling the switching logic of the erase and record circuits of a conventional video recorder.

The structure, function and operation of such conventional equipment is well-understood by those skilled in the art and therefore detailed explanation is unnecessary, suffice it to say that comments or descriptive matter herein pertaining to such equipment will concern those aspects which are of interest functionally and/or which are of interest with respect to being integrated with the equipment of the present invention.

Figure 1:
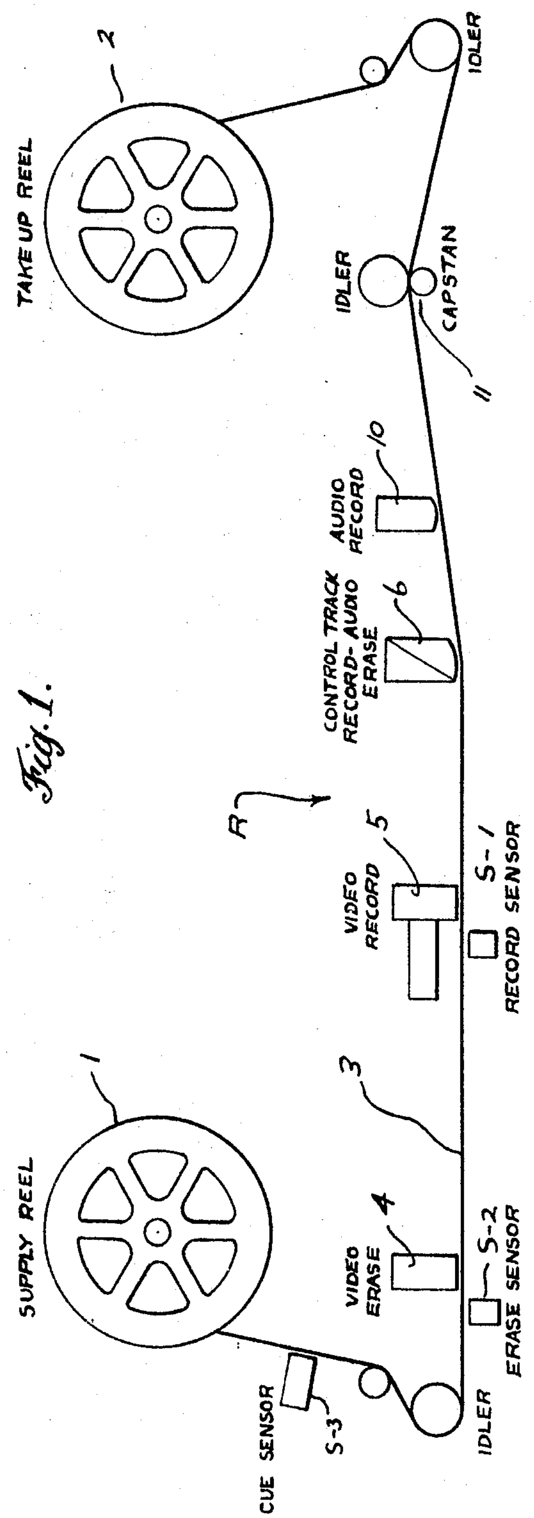
FIGURE 1 is a diagrammatic plan view of a conventional video tape recorder.
Figure 4:
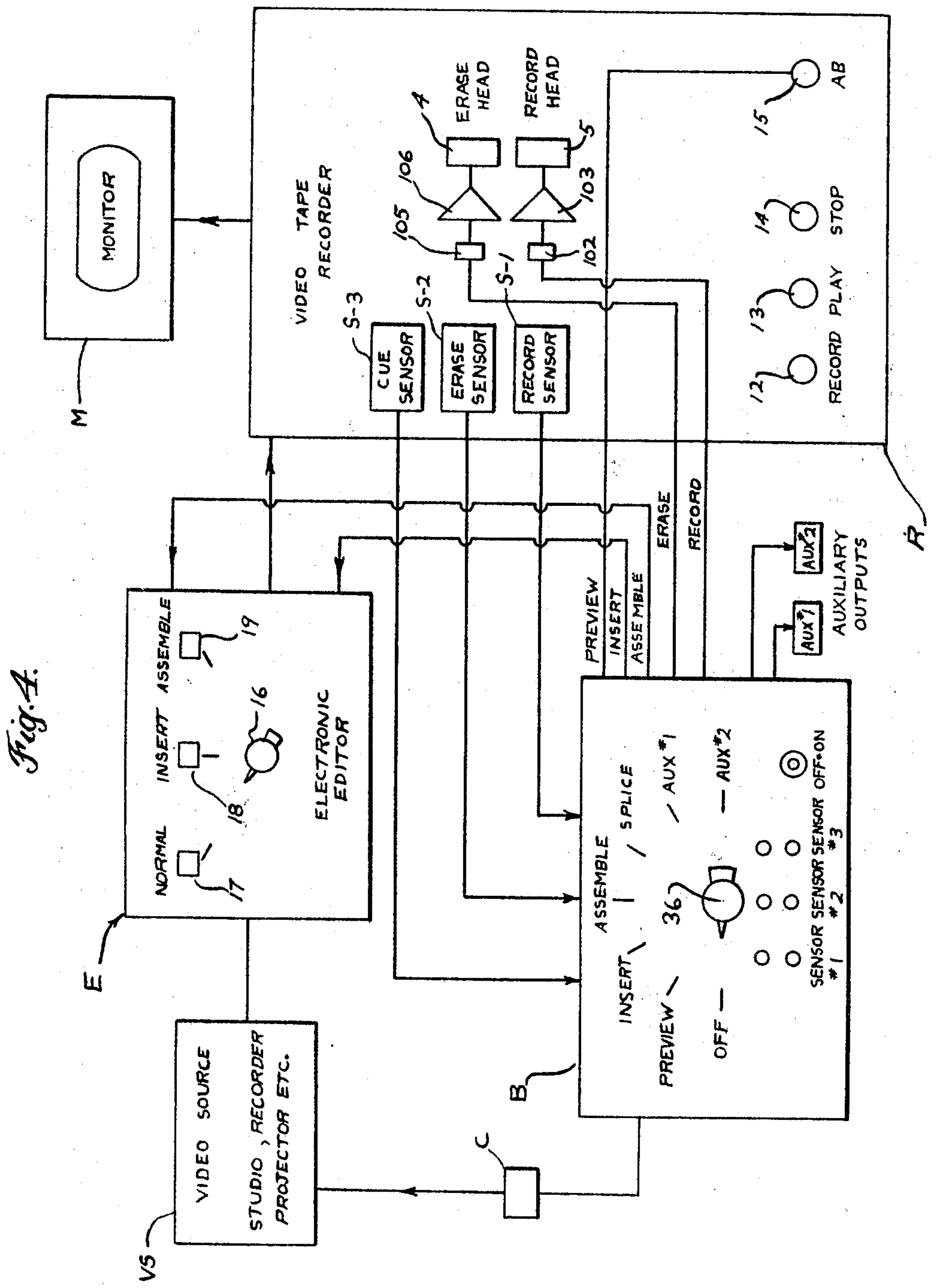
FIGURE 4 is a diagrammatic view of certain equipment of the invention as used in connection with conventional video recording equipment.

The video tape recorder R includes the usual parts such as shown in FIGURE 1, for example, the supply reel 1 and the take-up reel 2, these reels mounting the tape 3 which is adapted to pass between the reels in close association with the video erase head 4, video record head 5, the control track record-audio erase heads 6, and audio record head 10. The tape is moved by the driving capstan 11. As indicated in FIGURE 4, the video recorder has the operating buttons, such as the record button 12, play button 13, stop button 14 and the AB switch 15. The recorder also includes the monitor M. By virtue of certain circuitry in the tape recorder, the monitor can show the video intelligence being played back by the recorder or alternatively can show video intelligence from another source VS. This may be for example, another tape recorder, studio camera or the like. The switching of the picture or intelligence on the monitor is accomplished by the AB switch.

In certain instances, the invention contemplates that the video tape recorder R and an Electronic Editor be used in association with one another. The Editor is generally indicated by E in FIGURE 4. When the Editor is used with video tape recorder, the signal or video intelligence from the video source VS is fed into the Editor and thence to the record head on the recorder to be recorded in the tape, or, alternatively, the signal is fed to the monitor M. The Editor has three modes or conditions of operation: normal, insert and assemble. In the normal mode, the Editor is operatively disconnected from the video tape recorder so that the same is conditioned for normal operation. In the insert or assemble modes the Editor is arranged to control the switching logic for the erase and the record heads on the video recorder. The desired mode of operation is selected by turning the selector switch 16 (FIGURE 4) and then pressing the appropriate switch button 17, 18 or 19. The Editor modifies the switching logic of the erase 4 and record 5 heads in the tape recorder in order to compensate for the physical distance separating the erase and record heads. The erase head must be energized prior to the record head so as to avoid a double recording. In the usual case, the heads are separated along the motion path of the tape a distance equal to approximately nine inches. At a tape speed of 15 i.p.s., this represents slightly less than 18 television frames. The Editor operates (when the insert button 18 is pressed) to cause the erase head to be energized and then 18 frames latter for the record head to be energized.

The purpose of the Editor is to try to eliminate the cutting and splicing of tape for editing purposes. The Editor, however, has several disadvantages. A decided disadvantage is that it is impossible to preview and to cue. Also, the editing functions of assembly and insert are limited because of timing and coordination problems. The Editor is operator-actuated and on the insert mode, there is a difficult timing problem both at the start and the end of the insert. For example, on start, if the operator presses the insert button 18 too soon, a part of the previously recorded segment will be erased and, at the end of the insert, if the normal button 17 is pressed too late, part of the next following segment on the tape will be erased. If either erased part of a segment is essential this would necessitate a recording. The coordination problem is difficult whether the source of the insert is live or from a machine. For example, with live talent there is a cuing problem and there is no possibility at all of a rehearsal; i.e., to coordinate the performance with the pressing of the insert button. Where the source of the video intelligence is a machine, the coordination problem is difficult because of the roll time.

As will be explained more in detail hereinafter, the present invention effects a coordination of the Editor with the video tape recorder in a manner to eliminate the timing and coordination problems and in addition, the invention makes previewing and cuing possible. Further, the invention contemplates using the video tape recorder for the assembly and insert functions without using the Editor. In other words, the invention may be practiced on a conventional video tape recorder which does not have an Electronic Editor associated therewith.

With the above in mind then, I will now take up the equipment and methods of the invention.

One of the important features of the invention is the combination of the effaceable mark and a sensing device which detects or senses the presence of the mark as it passes through a predetermined point along the path of movement of the tape. By effaceable is meant a mark which is caused to disappear by rubbing out. Preferably the effaceable mark is a black mark which is put on the shiny side of the tape. The sensing device has a light source and photoconductive cell. The device is placed adjacent the shiny side of the tape and the shiny side is used to reflect the light from the source onto the photoconductive cell. The black stripe or mark when interrupting the light beam causes a change (decreases) in intensity which raises the impedance of the cell so that it momentarily stops conducting. The drop in current is used to trigger certain circuitry (which will be explained later) for previewing, cuing, inserting or assembling.

Figure 2:
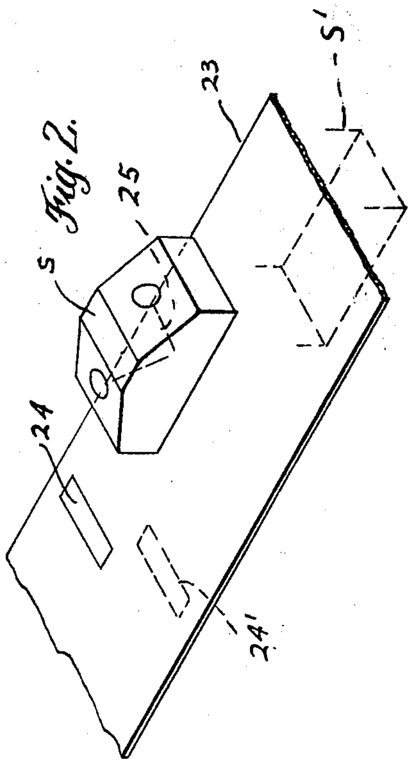
FIGURE 2 is a diagrammatic perspective view showing a piece of video tape in association with a sensing device.

The arrangement of the mark and device is diagrammatically illustrated in FIGURE 2 where the video tape is indicated at 23, the effaceable mark or stripe at 24, the sensing device at S, the light beam at 25. When the tape is moved say to the right as viewed in FIGURE 2, the stripe 24 will interrupt the beam 25 and cause a decrease in intensity.

Figure 3:
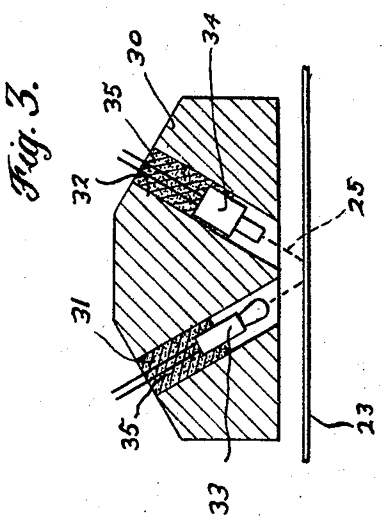
FIGURE 3 is a cross-sectional, elevational view of the sensing device of FIGURE 2.

The structure of the sensing device or head S is shown in FIGURE 3. This comprises the body 30 having a pair of apertures 31 and 32 which respectively hold the light source 33 and the photoconductive cell 34. The light from the source 33 travels down to the tape 23 from whence it is reflected up to the photoconductive cell 34. The light source 33 is preferably a tungsten filament lamp, commonly called a "wheat lamp" and the cell is preferably the cadmium sulphide type of photoconductive cell. The cell and wheat lamp are held in the respective apertures by water soluable mastic indicated at 35. This type of holding means is preferred because it makes for easy replacement of the lamp and/or cell. The body 30 is preferably made from brass because this is a good conductor of heat and also acts as an electrical shield for the lamp cell. The body 30 is held in a position quite close to the tape so to maximize reflection from the light source and to minimize random light from the room.

As disclosed herein, there are three sensing devices used. Each of these has the same structure as the sensing device S described above. As shown in FIGURE 1, the sensing device S–1, or record sensor, is mounted on the recorder closely adjacent to the video record head 5; the sensing device S–2, or erase sensor, is mounted on the recorder closely adjacent to the video erase head 4; and the cue sensing device S–3, or cue sensor, is mounted on the recorder adjacent to the supply reel 1. Actually, it makes little difference just exactly where the sensors are placed along the path of movement of the tape so long as they remain in fixed position with respect to any effaceable marks put on the tape to cause a sensor to function. The sensors are attached to the recorder by conventional means.

In its broadest aspect, it will be observed that the light source and photoconductive cell constitute respectively a transmitter and a receiver of radiant energy and that the light beam or path of energy transmission from the transmitter to the receiver lies in the path of motion of the effaceable mark on the tape. This mark interrupts or comes within the path of energy transmission and causes a change in the intensity of the transmitted light or energy.

Preferably, the effaceable mark is made by a suspension of carbon black in a solvent such as alcohol. This can be applied to the tape by a conventional felt-tipped applicator or it can be applied by a brush. For removing the stripe or mark, a piece of cloth or cotton saturated with the solvent is moved across the mark to wipe the same clean from the tape.

The effaceable feature is of special importance because it makes it possible to shift the position of the mark on the tape. By shifting the effaceable mark, a sensing head can be made to operate when any desired part of the tape passes through a predetermined position along the path of the tape. For example, with reference to FIGURE 1, it will be apparent that an effaceable mark placed on some portion of the tape will interrupt the beam of say the record sensor S–1 when that particular part of the tape which carries the mark arrives under the record sensor. If this mark is removed and a new mark placed on the tape, say at some position toward the supply reel, a greater amount of tape will have moved along the path before the beam from the record sensor S–1 is interrupted.

The effaceable mark can be very quickly put on and removed from the tape and can be precisely and accurately positioned on the tape. The mark is precisely positioned with the aid of the monitor or with the aid of the audio track. A typical example of how this is done will be explained hereinafter. In addition, the effaceable mark is put on and taken off without destroying or harming the tape and without adversely affecting or in any way disturbing the magnetic pattern in the tape.

Preferably the effaceable mark is put on the shiny or non-oxide face of the tape to take advantage of the reflective characteristics of the shiny side and also to maintain the mark away from the erase and recording heads. This eliminates the possibility of contamination of the oxide face of the tape and also prevents the possibility of faulty operation of the recording heads due to the mark.

With reference to FIGURE 2, it will be observed that the mark 24 is positioned adjacent the right hand edge of the tape and that the sensor S also occupies the same right hand position. The invention contemplates the use of a plurality of marks and sensors, and under such conditions, the marks and sensors occupy different transverse positions along the path of movement of the tape. For example, in FIGURE 2, the mark 24 and sensor S occupy positions adjacent the top edge of the tape and the mark 24' and sensor S' occupy positions adjacent the on the Splice position, power is fed through the arm 71 to the switch 47 and when the movable arm 78 engages the fixed terminal 80, power is supplied to the arm 72 on the wafer 64 and thence to the solenoid 95.

The record sensor S–1 and the erase sensor S–2 are used for the insert or assemble functions in place of the Editor. For descriptive purposes, I have designated the insert (or assemble) function without the Editor as "Splice." The Splice function requires the controlling of the time of operation of the erase and record heads in the video recorder. The record head operation is controlled by the record sensor S–1 and the erase head by the erase sensor S–2.

The record head is controlled as follows. With reference to wafer 62, it will be seen that the Splice terminal is connected to a solenoid 100. When solenoid 100 is energized, it closes the switch 101 which shorts out switch 102 which controls the record head amplifier circuit 103 (FIGURE 4). When the amplifier is actuated, it supplies power to the record head to cause operation of the same. Power is supplied to the solenoid 100 through the switch 47. With reference to wafer 63, it will be seen that when the arm 71 is on the Splice terminal, power is fed to the switch 47 and when the movable arm 78 engages the fixed terminal 79, power is supplied to the arm 70 on the wafer 62 which in turn supplies power to the solenoid 100.

The erase head 4 is controlled as follows. When the beam from the erase sensor S–2 is interrupted by an effaceable mark, the latching solenoid 54 operates the switch 58. The movable arm 85 engages the fixed terminal 86. The movable arm 85 is connected to the line 87 which is connected to the DC power source and when the movable arm 85 engages the fixed terminal 83, power is supplied to the arm 74 on the wafer 66. The Splice terminal on the wafer 66 is connected to a solenoid 104. When the solenoid 104 is energized, it closes the switch 105 which controls the erase head amplifier circuit 106 (see FIGURE 4). When the amplifier circuit 106 is actuated, it supplies power to the erase head to cause the same to function.

The cue sensor S–3 is used for the cue function and also for energizing the auxiliary devices *Aux*–1 and *Aux*–2. This is done as follows. With reference to wafer 65, it will be seen that the Splice terminal is connected to the cue device C and that the A–1 and A–2 terminals are respectively connected to the auxiliary devices *Aux*–1 and *Aux*–2. When a mark interrupts a beam from the sensor S–3, the relay 57 actuates the switch 59 in that the movable arm 82 is made to engage the fixed contact 83. The movable arm 82 is connected to the DC source by the line 84. Thus, the switch 59 can supply power to the arm 73 on the wafer 65. Depending upon the position of the arm, either the cue device or the auxiliary devices will be energized.

As indicated in FIGURE 4, the cue device C is tied in with the video source VS. The cue device is of conventional form for example a buzzer or a light to stimulate performers, or a relay or solenoid to cause operation of a projector or a video tape recorder.

With the above in mind, I will comment on the preview, cue, insert and assemble functions.

Suppose for example it is desired to preview an insert to be made on a master tape. The insert intelligence is to be supplied from the source VS. The cue sensor S–3 and the record sensor S–1 are set up in proper association with the tape, for example, the cue sensor adjacent the bottom edge and the record sensor adjacent the top edge. The switches 37 and 39 are closed. The control knob 36 is turned to the Off position. The control knob 16 in the Editor is turned to the Insert mode. The tape is then run in playback mode or condition and the video intelligence from the tape viewed in the monitor. At a point representing the desired ending of the recorded segment on the tape and the beginning of the to-be-recorded insert, the stop button on the tape recorder is pressed so as to stop the tape. An effaceable mark is made on the tape and in a transverse position to cooperate with the record sensor S–1. This is done at a point approximately two inches to the right of the video recorder head to compensate for tape drift. Another effaceable mark is put on the tape in transverse position to cooperate with the cue sensor S–3. The cue mark is separated from the record mark a distance representing the lead or roll time for the cue.

The control knob 36 on the console B is put on the Preview position. The tape is then run in playback mode. When the cue effaceable mark moves under the cue sensor S–3, the relay 57 will be energized and actuate switch 59 so that power will be supplied to the arm 73 and thence to the cue device C. Subsequently the effaceable mark will come under the record sensor S–1 and the relay 46 will be energized to actuate switch 47 and with arms 70 and 71 on Preview position, the AB switch 15 will be shorted out. The monitor will be switched from tape to the insert.

If the cue device is not being activated at the proper time, the cue effaceable mark can be removed and a new mark put on. Also, if the insert isn't switched to the monitor at the precise time, the effaceable mark which cooperates with the record sensor S–1 can be removed and a new mark put on. The marks are changed and the tape run through until the desired events are happening at precisely the desired time.

After the above is completed, the control knob is put in Off position and the tape is run in play back mode and the insert intelligence is watched on the monitor. At the desired time when the insert should be switched off, the stop button on the video recorder is actuated. Then a third effaceable mark is put on the tape at a position about two inches to the right of the record head and in a transverse position to cooperate with the record sensor S–1. The tape is again run in play back mode with the Control knob 36 in Preview position. The first mark will cause the cue device to be energized and the second mark will cause the AB switch to be shorted. The third effaceable mark will trigger the record sensor at the insert ending. This will cause the switch 47 to be actuated by relay 46 and the movable arm 78 will move back to the fixed contact 80. This unshorts the AB switch and the monitor is changed from insert intelligence to tape intelligence. The switch over point represents the terminus of the insert if the same were being recorded. The precise portion of the third effaceable mark is determined by watching the insert cut off on the monitor and adjusting the mark on the tape until the cutoff occurs at the desired place.

Once the preview of the insert has been set up as described above, the actual insert on the master tape can be very readily made. The Editor and the tape recorder are set up as initially described for the previewing operation and the control knob 36 in the console B is turned to the Insert position. Tape is then run in play back mode. First the cue effaceable mark comes under the cue sensor S–3 which operates to cause the switch 59 to supply power to the cue device C. Subsequently the record effaceable mark comes under the record sensor S–1 and this triggers the switch 47 which operates to supply power to the insert solenoid 90. The Editor then operates to energize the erase head 4 and record head 5 at the proper time and in the proper sequence and causes the signal from the video source VS to be fed to the video record head 5 and to be recorded on the tape. The recording of the insert continues until such time as the last effaceable mark comes under the record sensor and this triggers the switch 47. The movable arm 78 moves to the fixed contact 80 on the switch 77 and takes the power off of the insert solenoid 90 and supplies power to the normal solenoid 95. This causes the Editor to function to stop the recording.

The very real and important advantages of Preview lower edge of the tape. The two marks 24 and 24′ are spaced from one another in a transverse direction and the two sensors S and S′ are located so that the beam 26 of the head S is interrupted only by the stripe 24 (or a similar stripe placed in the same transverse position), and the beam of the sensor S′ is interrupted only by the mark 24′.

The placing of the sensors and associated marks in distinct patterns is for selective activation of various functions. For example, a mark and sensor located adjacent one edge of the tape may be used for a cuing function and a mark and sensor located adjacent the opposite edge may be used for an insert function. In this instance the mark for cuing would pass by both the erase sensor and the record sensor without interrupting either beam.

The manner in which the effaceable mark and the sensors are used for automatic preview, cue, insert and assemble will be explained below.

Figure 5:
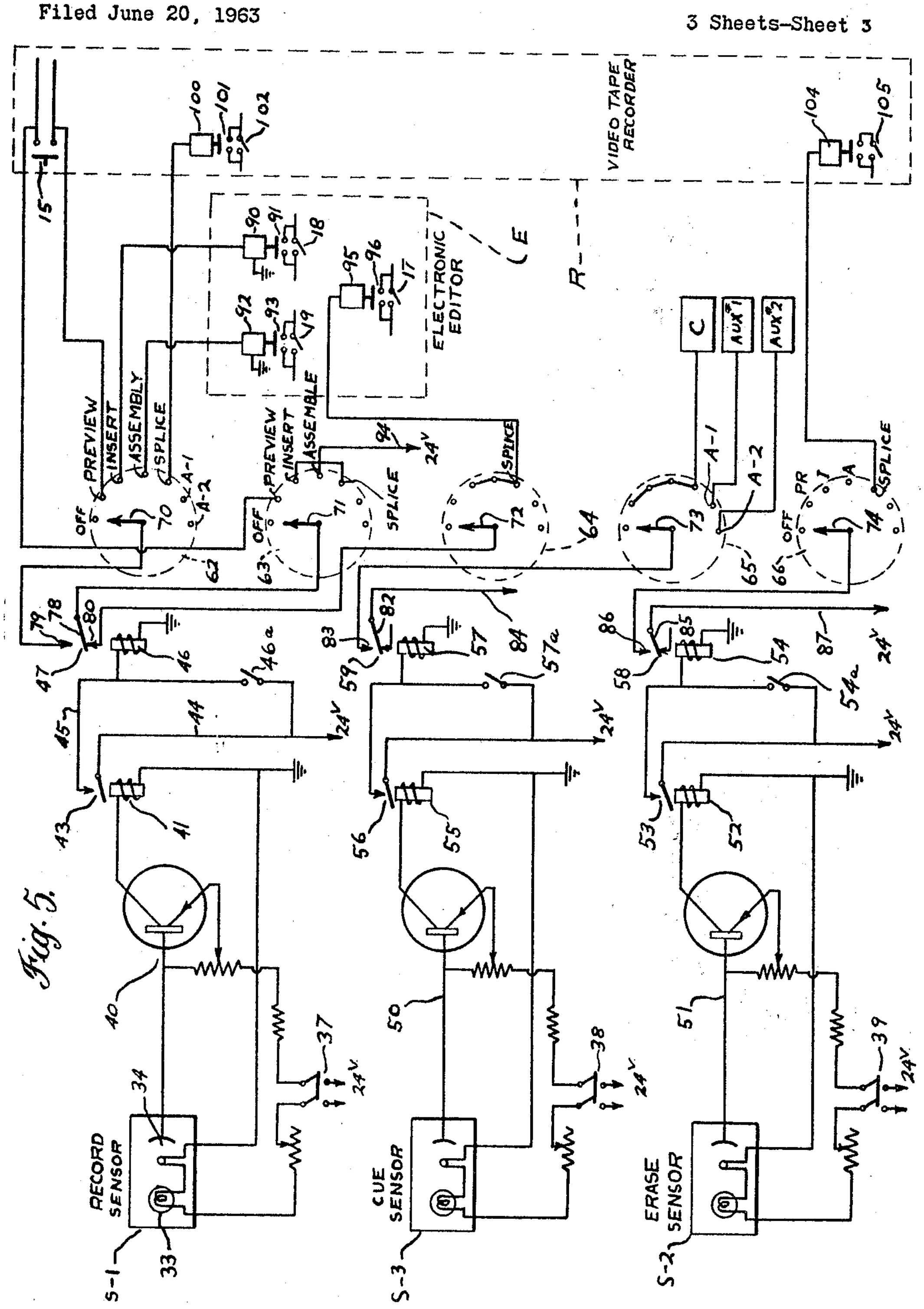
FIGURE 5 is a diagrammatic view illustrating a typical circuit arrangement for carrying out the preview and editing functions.

With reference to FIGURE 5, it will be noted that the sensors S–1, S–2 and S–3 are interconnected by circuitry to the video tape recorder R (dotted lines), to the Electronic Editor E (dotted lines), to a cue device C and to auxiliary devices labeled A*ux*–1 and A*ux*–2. Various of the components shown in the circuit of FIGURE 5 are housed in a console B (FIGURE 4). The console B has a control knob 36 which is movable to any of the positions indicated by Off, Preview, Insert, etc. The panel also has switch knobs 37, 38 and 39 which respectively control power to the sensors S–1, S–2 and S–3.

The record sensor S–1 is connected to a conventional DC transistor amplifier circuit generally indicated at 40. The output of the amplifier is connected to the relay 41. Power to the amplifier is supplied from a 24 v. DC source (not shown) via the switch 37. One side of the DC power source is grounded. The relay 41 has contacts which form a switch 43, one side of which is connected via line 44 to the DC power source. The other side of the switch 43 is connected via the line 45 to a latching relay 46. Closure of the switch 43 causes power to be applied to the latching relay 46. This causes the latching relay to actuate its contacts forming the switch 47. The latching relay switch 47 can be re-set by push-button switch **46*a***.

The erase sensor S–2 and the cue sensor S–3 have similar transistor amplifier circuits 50 and 51. The output of the amplifier 51 is connected to the relay 52 having contacts which form switch 53. Relay 52 controls the latching relay 54. The output of the amplifier circuit 50 is connected to a relay 55 having contacts which form a switch 56. Relay 55 controls the latching relay 57. The latching relay 54 actuates the contacts forming switch 58 and the latching relay 57 has contacts which form switch 59. The latching relays 54 and 57 can be re-set by push-button switches **54*a* and 57*a***.

Each of the sensors operates in the same manner for developing electrical power or an electrical signal to initiate the various functions. For example, assume that switch 37 is closed so that power is supplied to the sensor S–1 and to the amplifier 40. So long as the light beam is reflected from the light source to the photoconductive cell, the amplifier will supply power to the relay 41 to energize the same and cause the switch 43 to be open (as shown). When the effaceable mark interrupts the light beam, the cell will momentarily stop conducting and the amplifier will momentarily cause the relay 41 to be de-energized. The switch 43 will close so that power is momentarily supplied to the latching relay 46. The switch 47 is actuated. After the mark moves through and beyond the beam, the photoconductive cell again starts conducting and the amplifier 40 re-energizes the relay 41 so as to open the switch 43. The latching relay 46 then is de-energized. The latching relay switch 47, however, remains latched in position until such time as the latching relay 46 is again momentarily energized (by a mark interrupting the beam of sensor S–1, or by operation of the re-set button **46*a***).

From the above it will be apparent that the latching relay 46 and its switch 47 are triggered by the sensor S–1; the latching relay 54 and its switch 58 are triggered by the erase sensor S–2 and the latching relay 57 and its switch 59 are triggered by the cue sensor S–3. The three latching relays 46, 54 and 57 and their switches are used to control other electrical components which initiate the desired functions.

The amplifier circuits and the relays mentioned above are preferably housed in the console B. The control knob 36 actuates a conventional wafer type switch which is diagrammatically illustrated in FIGURE 5. The switch has five wafers 62–66 and each wafer has seven terminals. As indicated for the wafer 62, the terminals correspond to Off, Preview, Insert, etc. positions. The arms 70–74 are respectively associated with the wafers 62–66. The arms are ganged together (by means not shown) and rotate in unison by the control knob 36.

The latching relay switch 47 has contacts comprising a movable arm 78 and fixed terminals 79 and 80. The arm 78 is connected to the arm 71 on the wafer 63. The fixed terminal 79 is connected to the arm 70 of the wafer 62. The fixed terminal 80 is connected to the arm 72 of the wafer 64. The latching relay switch 59 has contacts including the movable arm 82 and a fixed terminal 83. The movable arm 82 is connected via line 84 to the DC source. The fixed terminal 83 is connected to the arm 73 of the wafer 65. The latching relay switch 58 has contacts comprising the movable arm 85 and a fixed terminal 86. The movable arm 85 is connected to the DC source via line 87. The fixed terminal 83 is connected to the arm 74 of the wafer 66.

The latching relay switch 47 and the Preview position on the wafers 62 and 63 are used to control the AB switch. Referring to the wafer 62, it will be seen that the Preview terminal is connected across one side of the AB switch 15 and with reference to wafer 63, it will be seen that the Preview terminal is connected to the other side of the AB switch. When the arms 70 and 71 are on Preview position and the switch 47 actuated, the arm 78 makes contact with the fixed terminal 79 and shorts out the AB switch. This has the same effect as manually closing the AB switch.

The latching relay switch 47 and the Insert, Assemble positions on wafers 62 and 63 control the insert and assemble functions when the Editor E is utilized. With reference to wafer 62, it will be seen that the Insert terminal is connected to the Insert solenoid 90. When the Insert solenoid is energized, it closes the switch 91 which shorts out the Insert switch 18 in the Editor. This has the same effect as manually closing the switch 18. Also in wafer 62, the Assemble terminal is connected to the Assemble solenoid 92. When solenoid 92 is energized, it closes the switch 93 which shorts out the Assemble switch 19 in the Editor. This has the same effect as manually closing the Assemble switch. Power is supplied to the solenoids 90 and 92 via switch 47. With reference to wafer 63, it will be seen that the Insert and Assemble terminals are ganged together and also connected to a line 94 which runs to the DC power source. When the arm 71 is on the Insert or Assemble position, power is fed from the Insert or Assemble terminal through the arm 71, to the switch 47. When the movable arm 78 engages the fixed terminal 79, power is transferred to the arm 70 on the wafer 62 and thence to the solenoid 90 or the solenoid 92, depending upon the position of the arm 70.

The Normal switch in the Editor is actuated through the latching relay switch 47 and wafer 64. In the wafer 64 the Insert, Assemble and Splice terminals are ganged together and connected to a solenoid 95. When the solenoid is energized, it closes the switch 96 which shorts out the Normal switch 17 in the Editor. This has the same effect as manually closing the Normal switch. Power is supplied to the solenoid 95 via switch 47. With reference to wafer 63, it will be seen that the Splice terminal is connected to the power line 94. Thus, when arm 71 is as described above will be readily apparent to those skilled in the art. The principal advantage, of course, is that duplication of time, effort and money is completely eliminated as all those concerned with the preparation of the tape can actually see how, when and where the insert will appear in the finished program. Thus, the time and location of the insert can be made to the complete satisfaction of the responsible parties.

Previewing for the assemble function and carrying out the assemble function is as easy and convenient as described above for previewing with the insert function. For example, to assemble a master tape, the first segment of video intelligence can be recorded in the conventional manner. The equipment of the present invention can be set up in preview and the exact desired ending of the first recorded segment can be located and an effaceable mark put on the tape for cooperation with the record sensor S–1. Then an effaceable mark for cuing can be put on the tape so as to properly cue the next video segment to be recorded. Preview of the next segment is then carried out and a third effaceable mark put on the tape to cooperate with the record sensor to effect the ending of the second segment. After the second segment has been set up as desired in relation to the first segment, the same is previewed. Then, for assembly purposes, the control knob 36 in the console B is put on the Assemble position. The effaceable mark for cue will trigger the cue sensor S–3 which will cue the source to be recorded. The record effaceable mark will then trigger the record sensor S–1 which will operate to energize the solenoid 92 and the effect of this is to cause the Editor E to start the recording of the second segment. The third effaceable mark will subsequently trigger the record sensor S–1 which will operate the switch 77 and cause power to be moved from the solenoid 92 and power to be supplied to the normal solenoid 95. This will cause the Editor to stop the recording. Additional segments of video intelligence then can be added to the master tape in the same way as described above.

It will be understood, of course, that the preview, insert and assemble functions can be carried out without the necessity of cuing.

As mentioned heretofore, the invention contemplates carrying out the assemble and/or insert functions without the use of the Electronic Editor E. The manner of doing this will be briefly described below.

Without the Editor, the record sensor S–1 and the erase sensor S–2 are used to actuate the erase head 4 and the record head 5 in the proper sequence and at the proper time. The record sensor and erase sensor are activated by closing the switches 37 and 38. The control knob 16 in the Editor is turned to the Normal mode and the Normal button 17 pressed. By means of the previewing function as described above, an effaceable mark is set up for cuing and then a first and a second effaceable mark is set up for cooperation with the record sensor S–1. The first of the latter two marks is for starting the recording of the insert and the second is for stopping the recording of the insert.

With the control knob on console B on the Splice position, the cue mark triggers the cue sensor S–3 so that the cue device C is operated. Then the first mark mentioned above triggers the erase sensor S–2 which operates the switch 84 so that power is supplied to the erase solenoid 104. This starts the erase head. When the first mark arrives at the record sensor S–1, it triggers the record sensor which operates the switch 47 so that power is supplied to the record solenoid 100. This starts the recording of the insert. At the end of the insert, the second mark triggers the erase sensor S–2 which operates the switch 58 so that the movable arm 85 moves away from the fixed contact 84 and power is removed from the erase solenoid 104. Subsequently the mark triggers the record sensor S–1 and the switch 47 is operated to remove power from the record solenoid 100. With the actuation of the record solenoid, the recording of the insert is terminated.

As will be apparent from an inspection of FIGURE 5, the auxiliary devices A*ux*–1 and A*ux*–2 can be activated by the cue sensor S–3 when the arm 73 is on the A–1 or A–2 terminals.

The auxiliary devices are used to operate a wide variety of devices connected with video recording, for example, tally lights, remote film projectors or slides, control of the video source, etc. For example, the cue sensor S–3 in conjunction with the effaceable marks on the tape can be used to switch the video intelligence from the source VS periodically so that a master tape is made simply by changing the video intelligence supplied to the video tape recorder.

As indicated heretofore, the term effaceable mark as used in the specification and claims means a mark comprising physical material on the surface of the tape, the material providing for the mark to be put on the tape manually, to be visible while on the tape and to be removable from the tape by manually wiping off.

I claim:

1. The method of assembling a master video tape comprising a plurality of serially arranged recorded segments of video intelligence, the method including the steps of:
recording a first segment of video intelligence on a master tape;
making an effaceable mark on the tape at a point on the tape representing the desired ending of said first recorded segment and the beginning of the to-be-recorded second segment, said effaceable mark comprising physical material on the surface of the tape, the material providing for the mark to be put on the tape manually, to be visible on the tape and to be removable from the tape by manually wiping off;
running the tape in play back mode and while running the tape generating a radiant energy beam and directing the beam on said tape in the path of motion of said mark and sensing the change in intensity of the beam when interrupted by the mark and developing electrical power as a function of said change intensity; and
using said electrical power to initiate the recording of the second video segment on the tape.

2. The method of assembling a master video tape comprising a plurality of serially arranged recorded segments of video intelligence, the method including the steps of:
recording a first segment of video intelligence on a master tape;
making an effaceable mark on the tape at a point on the tape representing the desired ending of the first recorded segment and the beginning of the to-be-recorded second segment, said effaceable mark comprising physical material on the surface of the tape, the material providing for the mark to be put on the tape manually, to be visible while on the tape and to be removable from the tape by manually wiping off;
running the tape in play back mode and while running the tape, using the tape to reflect a light beam and sensing the change in intensity of the light beam when interrupted by the mark and developing electrical power as a function of said change in intensity; and
using said electrical power to initiate the recording of the second video segment on the tape.

3. The method of making an insert on video tape having a plurality of serially arranged recorded segments of video intelligence, the method including the steps of:
making an effaceable mark on the tape at a point representing the desired ending of a recorded segment and the beginning of the to-be-recorded insert, said effaceable mark comprising physical material on the surface of the tape, the material providing for the mark to be put on the tape manually, to be visible while on the tape and to be removable from the tape by manually wiping off;

running the tape in play back mode and while running the tape, generating a radiant energy beam and directing the beam on said tape in the path of motion of said mark and sensing the change in intensity of the beam when interrupted by the mark and developing electrical power as a function of said change intensity; and using said electrical power to initiate the erasure of the recorded segment following said first segment and the recording of said insert on the erased portion of the tape.

4. The method of making an insert on video tape having a plurality of serially arranged recorded segments of video intelligence, the method including the steps of:

making an effaceable mark on the tape at a point representing the desired ending of a recorded segment and the beginning of the to-be-recorded insert, said effaceable mark comprising physical material on the surface of the tape, the material providing for the mark to be put on the tape manually, to be visible while on the tape and to be removable from the tape by manually wiping off;

running the tape in play-back mode and while running the tape, using the tape to reflect a light beam and sensing the change in intensity of the light beam when interrupted by the mark and developing electrical power as a function of said change in intensity; and using said electrical power to initiate the erasure of the recorded segment following said first segment and the recording of said insert on the erased portion of the tape.

5. The method of making an insert on video tape having a plurality of serially arranged recorded segments of video intelligence, the method including the steps of:

making an effaceable mark on the tape at a point representing the desired ending of a recorded segment and the beginning of the to-be-recorded insert, said effaceable mark comprising physical material on the surface of the tape, the material providing for the mark to be put on the tape manually, to be visible while on the tape and to be removable from the tape by manually wiping off;

running the tape in play back mode and while running the tape, detecting said mark and developing a first electrical power and using said power to initiate the erasure of the recorded segment following said first segment; and while continuing to run the tape, detecting said mark when the tape has moved the mark a predetermined distance from the first detection position and developing second electrical power and using said second power to initiate the recording of said insert in the erased portion of the tape.

6. The method of making an insert on video tape having a plurality of serially arranged recorded segments of video intelligence, the method including the steps of:

making a first effaceable mark on the tape at a point representing the desired ending of a recorded segment and the beginning of the to be recorded insert;

making a second effaceable mark on the tape at a point representing the end of the to-be-recorded insert, each said effaceable mark comprising physical material on the surface of the tape, the material providing for the mark to be put on tape manually, to be visible while on the tape and to be removable from the tape by manually wiping off;

running the tape in play back mode and while running the tape, using the tape to reflect a light beam and sensing the change in intensity of the light beam when interrupted by said first mark and developing electrical power as a function of said change in intensity and using said electrical power to initiate the erasure of the recorded segment following said first segment;

continuing to run said tape and using the tape to reflect a second light beam and sensing the change in the intensity of the second light beam when interrupted by said first mark and developing second electrical power as a function of the change in intensity of said second light beam and using said second electrical power to initiate recording of the insert on the erased portion of the tape;

continuing to run said tape and sensing the change in intensity of said first light beam when interrupted by said second mark and developing third electrical power as a function of the change in intensity of said first light beam when interrupted by said second mark and using said third electrical power to stop said erasure and thereafter;

sensing the change in intensity of said second light beam when interrupted by said second mark and developing fourth electrical power as a function of the change in intensity of said second light beam when interrupted by said second mark and using said fourth electrical power to stop said recording.

7. The method of previewing an insert to be made on a video tape comprising a plurality of serially arranged recorded segments, the method including the steps of:

making an effaceable mark on the tape adjacent a point on the tape representing a desired ending of a recorded segment and the beginning of the to-be-recorded insert, said effaceable mark comprising physical material on the surface of the tape, the material providing for the mark to be put on the tape manually, to be visible while on the tape and to be removable from the tape by manually wiping off;

running the tape in play back mode and causing the segment played back to be viewable on a monitor and while running the tape generating a radiant energy beam and directing the beam on said tape in the path of motion of said mark and sensing the change in intensity of the beam when interrupted by the mark and developing electrical power as a function of said change in intensity; and using said electrical power to initiate removal of the played back segment from the monitor and to cause the segment to be recorded to be viewable on the monitor.

8. In combination, a video tape recorder and means for editing video tape:

an erase head and a record head;

a strip of said video tape movable in translation past said heads;

an effaceable mark on said tape;

a sensing head mounted adjacent the path of movement of said tape, the head including a light source and a photoconductive cell and means mounting the source and the cell to cause light from the source to be reflected from the tape onto the cell, the reflected beam being in the path of motion of said mark and the mark, when interrupting the beam, causing a change in the intensity of the light to the cell;

means connected to said cell to develop electrical power as a function of said change in intensity; and mechanism connected to said means and to said erase head and record head and operated by said means to energize and de-energize the heads for the editing functions.

9. In combination, a video tape recorder and means for for editing video tape:

an erase head and a record head;

a strip of said video tape movable in translation past said heads;

an effaceable mark on said tape, the mark being made of non-reflective material;

a sensing head mounted along the path of movement of said tape, the head including a light source and a photoconductive cell and means mounting the source and the cell to cause light from the source to be reflected from the tape onto the cell, the reflected beam being in the path of motion of said mark and the mark, when interrupting the beam, causing a decrease in the intensity of the light to the cell, the source and cell being disposed closely adjacent the tape to maximize the amount of light from the source reflected to the cell and to minimize the reflection of random light to the cell;

means connected to said cell to develop electrical power as a function of said decrease in intensity; and mechanism connected to said means and to said erase head and record head and operated by said means to energize and de-energize the heads for the editing functions.

10. In combination, a video tape recorder and means for editing video tape:

an erase head and a record head;

a strip of said video tape movable in translation past said heads;

an effaceable mark on said tape;

a sensing head mounted adjacent the path of movement of said tape, the head including a transmitter and a receiver of radiant energy, and means mounting the transmitter and the receiver to cause the path of energy transmission from transmitter to the receiver to be in the path of motion of said mark and the mark, when interrupting the energy path, causing a change in the intensity of the transmitted energy;

means connected to said cell to develop electrical power as a function of said change in intensity; and mechanism connected to said means and to said erase head and record head and operated by said means to energize and de-energize the heads for the editing functions.

11. In combination, a video tape recorder and means for editing video tape:

an erase head and a record head;

a strip of said video tape movable in translation past said heads;

a first effaceable mark on said tape, the mark being disposed adjacent one edge of the tape;

a second effaceable mark on the tape, the second mark being disposed adjacent the opposite edge of said tape;

a first sensing head mounted adjacent the path of movement of said tape, the head including a first light source and a first photoconductive cell and means mounting the source and the cell to cause light from the source to be reflected from the tape onto the cell, the reflected beam being in the path of motion of first said mark and the first mark, when interrupting the beam, causing a change in the intensity of the light to the cell;

means connected to said cell to develop electrical power as a function of said change in intensity;

mechanism connected to said means and to at least one of said erase head and record head and operated by said means to energize and de-energize said one head for the editing functions;

a second sensing head mounted adjacent the path of movement of said tape, the second head including a second light source and a second photoconductive cell and means mounting the second source and the second cell to cause light from the second source to be reflected from the tape onto the second cell, the reflected beam being in the path of motion of second said mark and second said mark, when interrupting last said beam, causing a change in the intensity of the light to the cell, the two said marks being spaced from one another in a direction transverse the tape and two said heads locating the respective beams to provide that the path of motion of the first mark does not interrupt the beam from the second source and to provide that the path of motion of the second mark does not interrupt the beam from the first source;

second means connected to said second cell to develop electrical power as a function of the change in light intensity to the second cell; and second mechanism connected to said second means to receive power therefrom for use in cuing.

12. In combination, a video recorder and means for editing the video recording medium:

an erase head and a record head;

a magnetic recording medium for recording video intelligence;

means for moving said recording medium past said heads;

an effaceable mark on said medium;

a sensing head mounted adjacent the path of movement of said recording medium, the sensing head including a light source and a photoconductive cell and means mounting the source and the cell to cause light from the source to be reflected from the recording medium onto the cell, the reflected beam being in the path of motion of said mark and the mark, when interrupting the beam, causing a change in the intensity of the light to the cell;

means connected to said cell to develop electrical power as a function of said change in intensity; and mechanism connected to said means and to said erase head and record head and operated by said means to energize and de-energize the heads for the editing functions.

References Cited

UNITED STATES PATENTS

| | | | |
|---|---|---|---|
| 2,773,120 | 12/1956 | Masterson | 179—100.2 |
| 2,872,590 | 2/1959 | Leavens | 250—239 |
| 2,952,416 | 9/1960 | Sampson | 250—219 |
| 3,019,346 | 1/1962 | Laycak | 250—219 |
| 3,026,369 | 3/1962 | Lohmann et al. | 179—100.2 |
| 3,030,441 | 4/1962 | Nemeth | 179—100.2 |
| 3,180,930 | 4/1965 | Bounsall | 179—100.2 |

FOREIGN PATENTS

| | | |
|---|---|---|
| 887,512 | 1/1962 | Great Britain. |

BERNARD KONICK, Primary Examiner

J. R. GOUDEAU, Assistant Examiner

U.S. Cl. X.R.

178—6; 250—219